(12) United States Patent
Ullrich et al.

(10) Patent No.: US 8,104,544 B2
(45) Date of Patent: Jan. 31, 2012

(54) HAND MACHINE TOOL

(75) Inventors: Andre Ullrich, Echterdingen (DE); Tobias Herr, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 51 days.

(21) Appl. No.: 12/529,189

(22) PCT Filed: Feb. 7, 2008

(86) PCT No.: PCT/EP2008/051473
§ 371 (c)(1), (2), (4) Date: Dec. 11, 2009

(87) PCT Pub. No.: WO2008/107256
PCT Pub. Date: Sep. 12, 2008

(65) Prior Publication Data

US 2010/0096153 A1 Apr. 22, 2010

(30) Foreign Application Priority Data

Mar. 2, 2007 (DE) ........................ 10 2007 009 986

(51) Int. Cl.
*B23B 45/02* (2006.01)
*B23B 45/16* (2006.01)

(52) U.S. Cl. ......................................... 173/48; 173/104

(58) Field of Classification Search .................... 173/48, 173/109, 104, 201
See application file for complete search history.

(56) References Cited

U.S. PATENT DOCUMENTS

| | | | | |
|---|---|---|---|---|
| 3,500,696 | A | 3/1970 | Berube | |
| 4,506,743 | A * | 3/1985 | Grossmann | 173/48 |
| 4,719,976 | A * | 1/1988 | Bleicher et al. | 173/109 |
| 4,763,733 | A * | 8/1988 | Neumaier | 173/48 |
| 4,998,588 | A * | 3/1991 | Manschitz | 173/47 |
| 5,159,986 | A * | 11/1992 | Hoser | 173/48 |
| 5,366,025 | A * | 11/1994 | Dutschk et al. | 173/109 |
| 5,456,324 | A * | 10/1995 | Takagi et al. | 173/48 |
| 5,842,527 | A * | 12/1998 | Arakawa et al. | 173/48 |
| 6,035,945 | A * | 3/2000 | Ichijyou et al. | 173/48 |
| 6,109,364 | A * | 8/2000 | Demuth et al. | 173/48 |
| 6,176,321 | B1 * | 1/2001 | Arakawa et al. | 173/48 |
| 6,192,996 | B1 * | 2/2001 | Sakaguchi et al. | 173/48 |
| 6,460,627 | B1 * | 10/2002 | Below et al. | 173/48 |
| 6,510,903 | B2 * | 1/2003 | Funfer | 173/48 |
| 6,520,267 | B2 * | 2/2003 | Funfer et al. | 173/48 |
| 6,712,156 | B2 * | 3/2004 | Funfer | 173/48 |
| 7,174,969 | B2 * | 2/2007 | Droste | 173/48 |
| 7,264,065 | B2 * | 9/2007 | Simm et al. | 173/48 |
| 7,331,496 | B2 * | 2/2008 | Britz et al. | 227/48 |
| 7,395,872 | B2 * | 7/2008 | Duesselberg et al. | 173/48 |
| 7,549,484 | B2 * | 6/2009 | Iwakami et al. | 173/48 |
| 7,708,084 | B2 * | 5/2010 | Duesselberg et al. | 173/48 |

(Continued)

FOREIGN PATENT DOCUMENTS

DE 102004045117 A1 3/2006

(Continued)

*Primary Examiner* — Lindsay Low
(74) *Attorney, Agent, or Firm* — Ronald E. Greigg

(57) ABSTRACT

The invention relates to a hand machine tool, in particular, a hammer drill or chisel, having a gearbox housing and a gearbox unit with a switching device. The switching device includes a switching spring and an operating unit which may be mounted in the gearbox housing with a transfer element. According to the invention, the switching spring has a housing region provided for housing the transfer element of the assembled operating unit, on assembly of the gearbox housing and the gearbox unit.

20 Claims, 4 Drawing Sheets

U.S. PATENT DOCUMENTS

| | | | | |
|---|---|---|---|---|
| 7,806,199 | B2 * | 10/2010 | Pohl et al. | 173/48 |
| 7,854,274 | B2 * | 12/2010 | Trautner et al. | 173/48 |
| 2005/0269116 | A1 * | 12/2005 | Frauhammer et al. | 173/48 |
| 2007/0102174 | A1 | 5/2007 | Duesselberg et al. | |

FOREIGN PATENT DOCUMENTS

| | | | |
|---|---|---|---|
| WO | WO 2006029916 | A1 * | 3/2006 |

* cited by examiner

HAND MACHINE TOOL

CROSS-REFERENCE TO RELATED APPLICATION

This application is a 35 USC 371 application of PCT/EP2008/051473 filed on Feb. 7, 2008.

BACKGROUND OF THE INVENTION

1. Field of the Invention

The invention is based on a hand-held power tool.

2. Description of the Prior Art

There is already a known hand-held power tool that has a transmission housing and a transmission unit equipped with a switch device. The switch device also has a switch spring and an actuating unit, which can be mounted in the transmission housing and is equipped with a transmitting element.

ADVANTAGES AND SUMMARY OF THE INVENTION

The invention is based on a hand-held power tool, in particular a rotary hammer and/or a hammer chisel, having a transmission housing and a transmission unit equipped with a switch device that has a switch spring and an actuating unit, which can be mounted in the transmission housing and is equipped with a transmitting element.

According to one proposed embodiment, the switch spring has a receiving region provided to accommodate the transmitting element of the assembled actuating unit upon assembly of the transmission housing and transmission unit. In this context, the expression "assembly of the transmission housing and transmission unit" is understood in particular to mean a sliding of the transmission housing onto the transmission unit in a preferred assembly direction or a sliding of the transmission unit into the transmission housing in a preferred assembly direction. With the embodiment of the hand-held power tool according to the invention, it is possible to achieve a structurally simple mounting of the switch spring on the actuating unit during a simultaneous assembly of the transmission housing and transmission unit. This can be achieved in a particularly advantageous fashion if the switch spring has at least two spring legs that define the receiving region. Preferably, after an assembly of the transmission housing and transmission unit, the actuating unit is ready for operation, situated in a first switched position. The actuating unit is advantageously provided for switching between at least two different switched positions.

According to another proposed embodiment, the two spring legs are spaced apart from each other perpendicular to an assembly direction, making it possible to achieve a low-wear insertion of the actuating unit into the receiving region of the switch spring. The term "assembly direction" here is understood in particular to mean a direction in which a translatory relative movement of the transmission housing in relation to the transmission unit occurs during assembly of the transmission housing with the transmission unit.

If the spring legs are provided to move in an axial direction of at least one switch element of the transmission unit when the actuating unit is moved in a rotation direction, then this makes it possible to achieve an advantageous transformation of a switching motion, eliminating the need for additional parts.

According to another proposed embodiment of the invention, the switch spring constitutes at least one energy storage mechanism in which a switching force can be stored, thus making it advantageously possible to achieve a particularly low-wear switching between two switch elements that have switched positions synchronous to each other. If the two switch elements are situated in a position in which they are rotationally offset from each other, the switching force can be advantageously stored in the switch spring until the two switch elements assume synchronous switched positions at which point one of the two switch elements can be slid toward the other switch element because of the stored switching force, thus permitting the two switch elements to engage with each other in order to carry out a torque transmission.

According to another proposed embodiment of the invention, at least one spring leg of the switch spring has a switching bevel against which the transmitting element presses during at least one switching procedure, making it possible to achieve a structurally simple axial movement of a switch element connected to the switch spring during a rotating movement of the actuating unit. This can be achieved in a particularly advantageous fashion if the switching bevel of the spring leg has at least one guide surface for guiding the transmitting element.

According to another proposed embodiment of the invention, the two spring legs each have a respective leg region and the two leg regions are situated in a region of the transmitting element, in a plane parallel to the assembly direction, permitting the transmitting element to transmit a movement, in particular a rotating movement of the actuating unit, to the switch spring or more precisely, the spring legs, in a particularly simple fashion.

If the switch spring also has a subregion for accommodating a switch element of the transmission unit, then it is possible to advantageously achieve a direct coupling to the switch element, eliminating the need for additional parts.

BRIEF DESCRIPTION OF THE DRAWINGS

The invention will be better understood and further objects and advantages thereof will become more apparent from the ensuing detailed description of a preferred embodiment taken in conjunction with the drawings, in which.

DESCRIPTION OF THE PREFERRED EMBODIMENT

Figure 1:
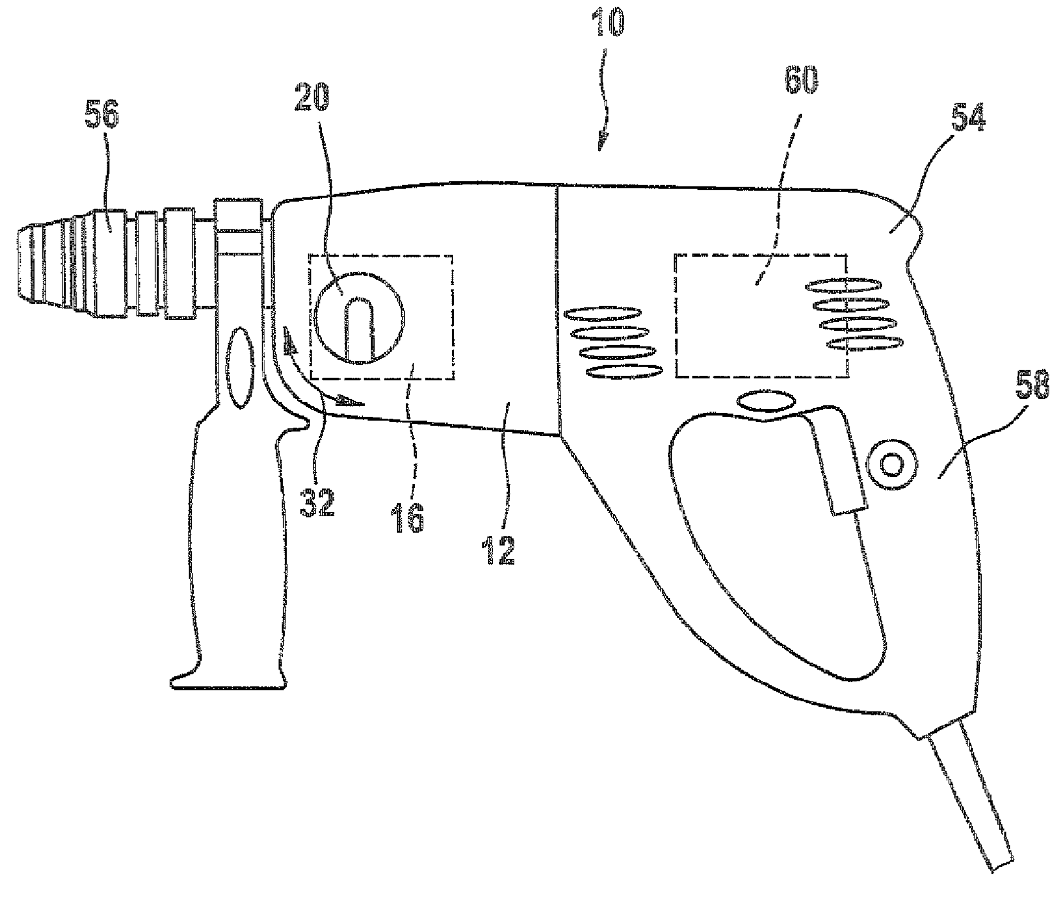
FIG. 1 shows a hand-held power tool according to the invention, equipped with a switch device.
Figure 2:
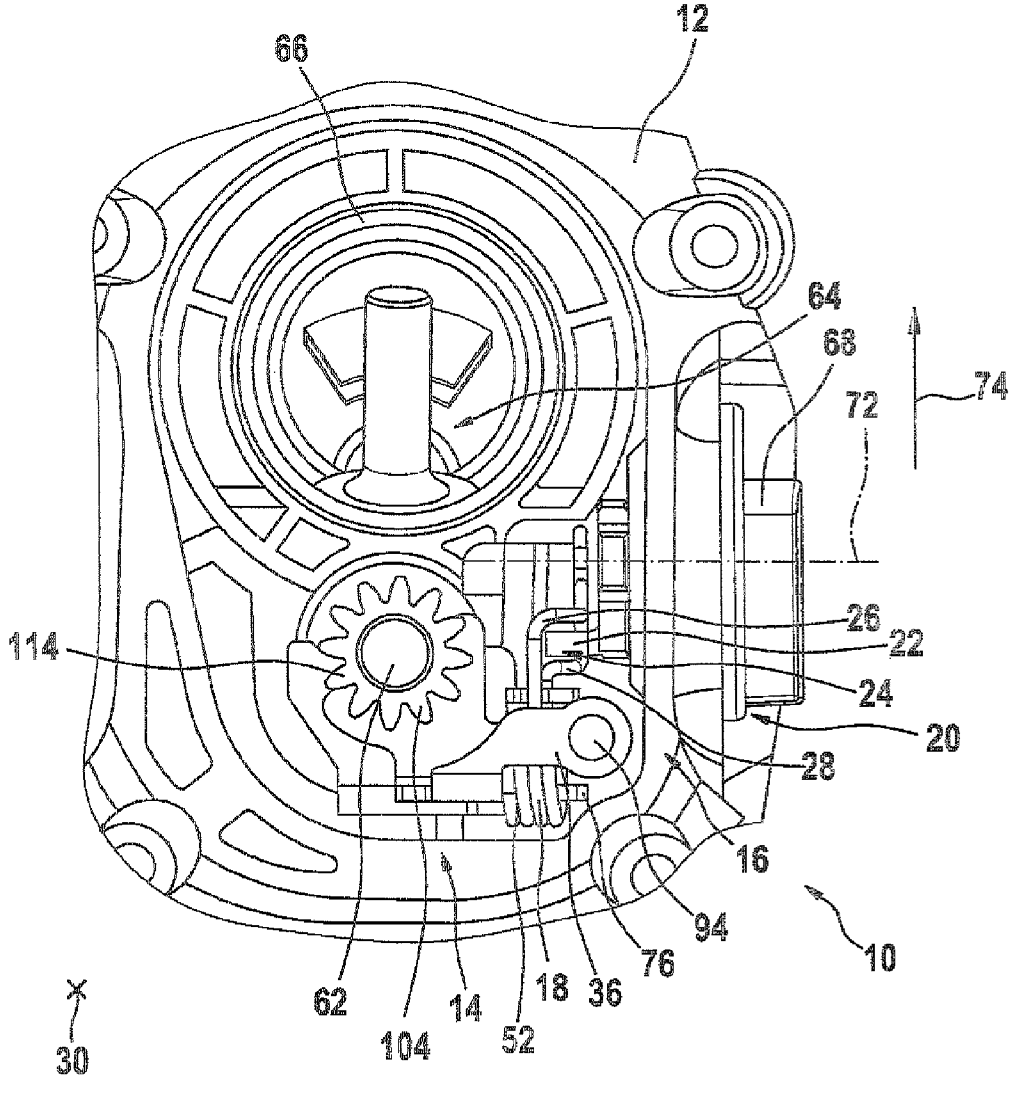
FIG. 2 shows a section through a subregion of the hand-held power tool, equipped with a transmission unit and a transmission housing.

FIG. 1 shows a hand-held power tool 10 embodied in the form of a rotary hammer. The hand-held power tool 10 includes a housing 54 with a transmission housing 12 and, in a front region, a tool holder 56 for holding a tool. At an end oriented away from the front region, the hand-held power tool 10 has a main handle 58 for actuating the hand-held power tool 10 and for transmitting force from an operator to the hand-held power tool 10. The hand-held power tool 10 has a drive unit 60 comprised of an electric motor to produce a drive moment. The drive torque of the drive unit 60 is transmitted via an intermediate shaft 62 of the hand-held power tool to an impact mechanism 64, which is only partially shown in FIG. 2 for the sake of visibility, and/or to a rotating output element constituted by a hammer tube 66 (FIG. 2). In order to switch between different drive speeds and/or drive modes of a tool in the tool holder 56, the hand-held power tool 10 has a switch device 16 equipped with an actuating unit 20 that includes a selector knob 68.

Figure 3:
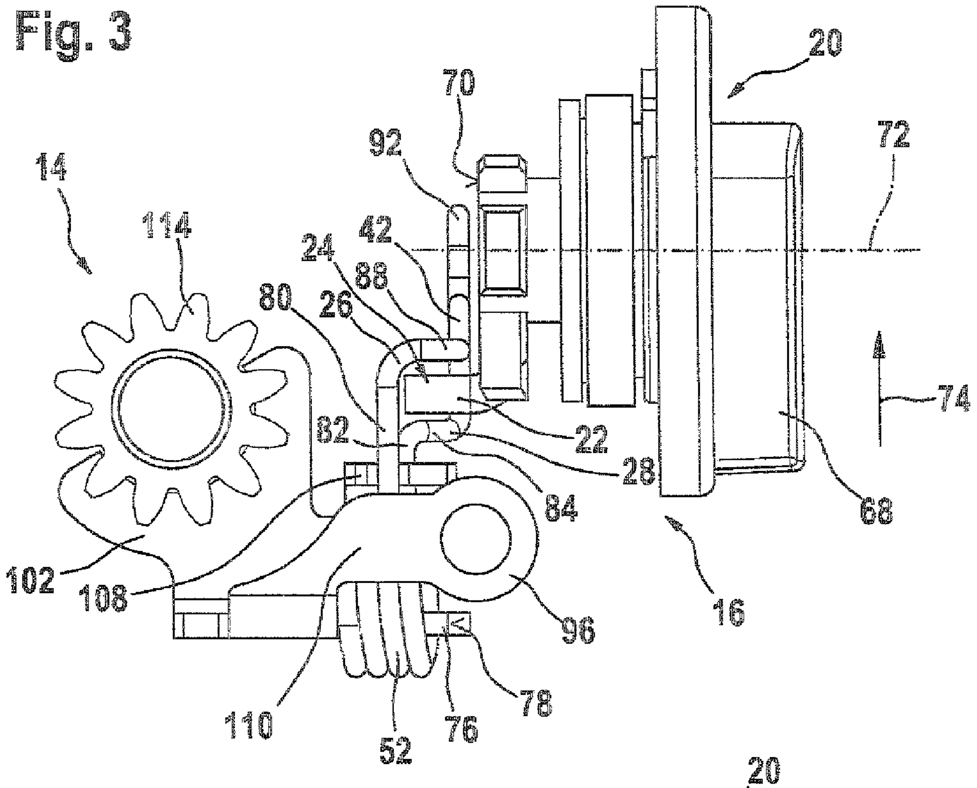
FIG. 3 is a side view of the switch device.

FIG. 2 shows a subregion of the handheld power tool 10, having a transmission unit 14 with the switch device 16 and having the transmission housing 12. The switch device 16 for switching between different transmission stages of the transmission unit 14 has a switch spring 18 and the actuating unit mounted in the transmission housing 12. To this end, the switch spring 18 transmits a rotating movement of the actuating unit 20 to an axially movable switch element 36 embodied in the form of a switching plate belonging to the transmission unit 14. The switch spring 18 has two spring legs 26, 28 that define a receiving region 24 for accommodating a transmitting element 22 of the actuating unit 20. The transmitting element 22 is embodied in the shape of a bar and is situated on the actuating unit 20, extending in a direction of a rotation axis 72 of the actuating unit 20, eccentric to the rotation axis 72, on an inner side 70 of the actuating unit 20 oriented away from the selector knob 68 (FIGS. 2 and 3). When the operator of the hand-held power tool 10 actuates the switch or more precisely, executes a rotating movement of the actuating unit 20, the bar-shaped transmitting element 22, which is arranged eccentric to the rotation axis 72, transmits a force to one of the two spring legs 26, 28 of the switch spring 18 (FIGS. 2 through 5).

Upon assembly of the transmission housing 12 and the transmission unit 14 in an assembly direction 30 pointing perpendicularly into the plane of the drawing in FIG. 2, the receiving region 24 for accommodating the transmitting element 22 makes it possible to move the transmission housing 12 in relation to the transmission unit 14 and to slide the transmission housing 12, together with the actuating unit 20 that has already been mounted into it, onto the transmission unit 14. To this end, the two spring legs 26, 28 of the switch spring 18 are spaced apart from each other perpendicular to the assembly direction 30. The two spring legs 26, 28 are thus spaced apart from each other in a direction 74 that is oriented essentially perpendicular to the rotation axis 72 and perpendicular to the assembly direction 30. In addition, the two spring legs 26, 28 are situated spaced apart from each other parallel to the rotation axis 72.

Figure 4:
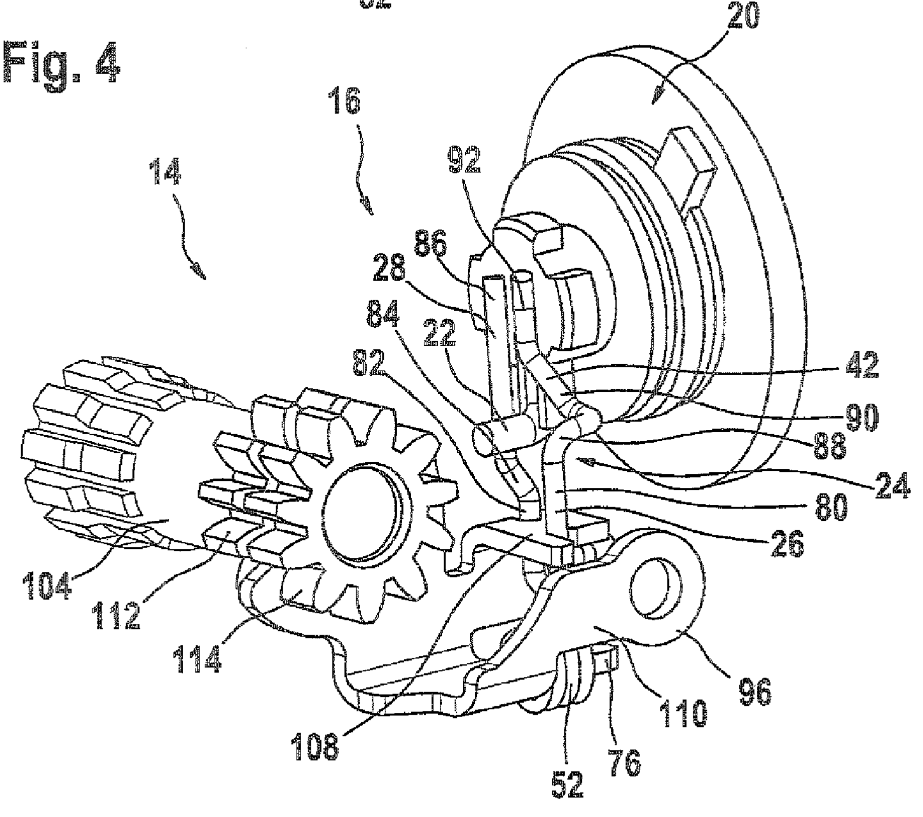
FIG. 4 is a perspective view of the switch device.
Figure 5B:
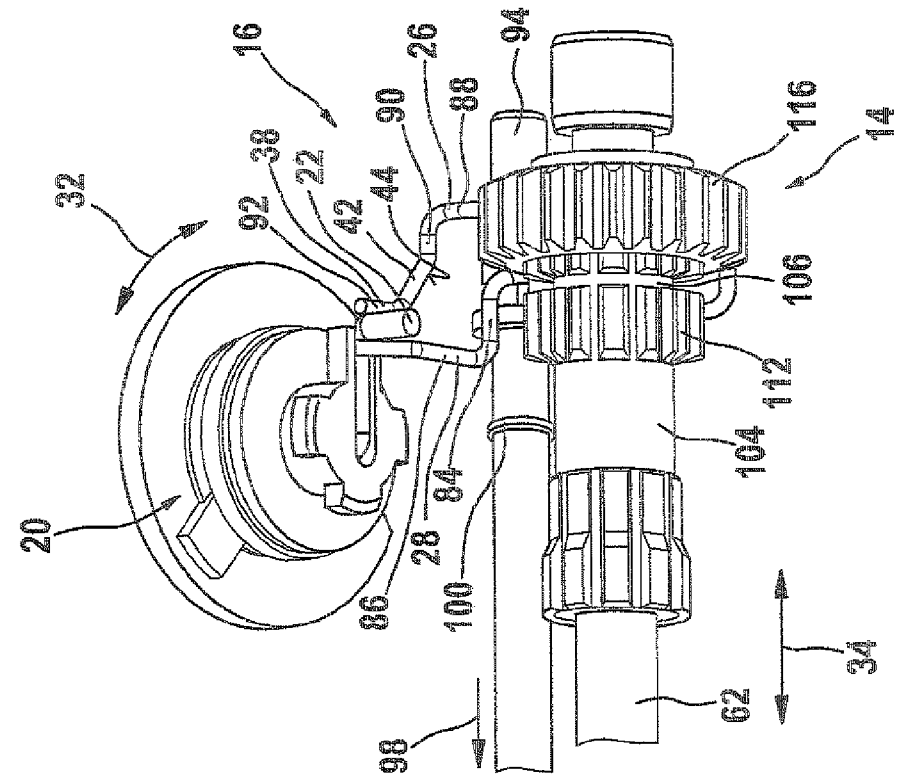
FIG. 5 shows perspective views of the switch device and the transmission unit in a first switched position (FIG. 5*a*) and in a second switched position (FIG. 5*b*).
Figure 5A:
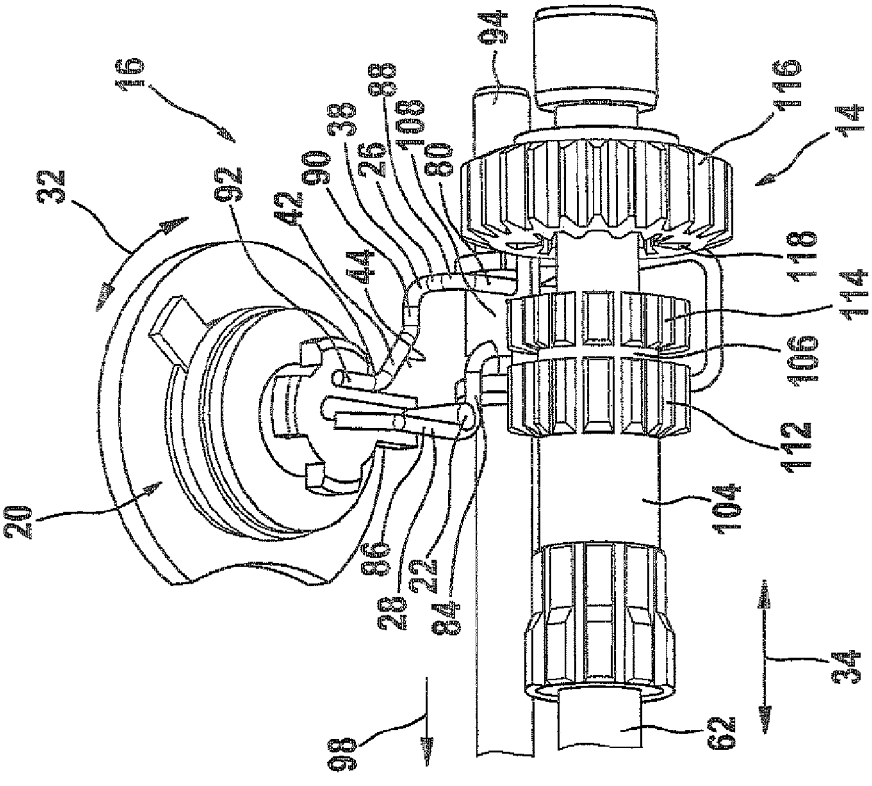

In order for the switch spring 18 to transmit a force to the switch element 36 during a switching movement or more precisely during a rotating movement of the actuating unit 20, the switch spring 18 has a subregion 52 composed of a helical spring (FIGS. 2 through 4). The subregion 52 with the helical spring here encloses a receiving region for accommodating the switch element 36. To this end, the switch element 36 has a bar-shaped coupling element 76 on a side 78 oriented toward the actuating unit 20 (FIG. 3). The two spring legs 26, 28 each have a respective first leg region 80, 82 that extends in the direction 74 from the subregion 52 with the helical spring (FIGS. 3 through 5). The first leg region 80 of the first spring leg 26 in the assembly direction 30 is longer in the direction 74 than the first leg region 82 of the second spring leg 28 in the assembly direction 30. The first leg region 82 of the second spring leg 28 is adjoined by a second leg region 84, which is perpendicular to the first leg region 82 and extends toward the actuating element 20 in a direction of a superposition of the assembly direction 30 and the rotation axis 72. In addition, the second spring leg 28 has a third leg region 86 that adjoins the second leg region 84 and extends perpendicular to the second leg region 84 in the direction 74. The third leg region 86 rests against the transmitting element 22 of the actuating unit 20, after the transmitting element 22 in the assembly direction 30.

The first leg region 80 of the first spring leg 26 is perpendicularly adjoined by a second leg region 88 that extends parallel to the rotation axis 72, toward the actuating unit 20. The second leg region 88 of the first spring leg 26 is perpendicularly adjoined by a third leg region 90 that extends at first parallel to the assembly direction 30. The third leg region 90 of the first spring leg 26 also includes a switching bevel 42 that, in addition to a span component oriented in the assembly direction 30, has a span component oriented in the direction 74. The third leg region 90 is adjoined by a fourth leg region 92 of the first spring leg 26 that extends in direction 74. The fourth leg region 92 of the first spring leg 26 and the third leg region 86 of the second spring leg 28 are essentially situated in a plane that extends parallel to the assembly direction 30.

When an operator of the hand-held power tool 10 actuates the switch or more precisely, moves the actuating unit 20 in a rotation direction 32, the switch spring 18 moves the switch element 36 in an axial direction 34. To this end, the switch element 36 is supported so that it is able to move on a guide rod 94 of the transmission unit 14 in the axial direction 34, which extends parallel to the assembly direction 30 (FIGS. **5*a* and 5*b*). The switch element 36 has two annular regions 96 that are provided to accommodate the guide rod 94. The two regions 96 are situated on the switch element 36, one after the other along the guide rod 94. In order to limit a movement of the switch element 36 on the guide rod 94 in a direction 98, the guide rod 94 is equipped with a stop element 100 embodied in the form of a snap ring that is affixed to the guide rod 94. The switch element 36 also has a coupling region 102 provided for coupling it to the transmission element 104 of the transmission unit 14 embodied in the form of a gear unit (FIGS. 3 through 5). The transmission element 104 of the transmission unit is supported so that it is able to move in the axial direction 34 on the intermediate shaft 62 in order to switch between the different transmission stages. To permit a coupling of the switch element 36 to the transmission element 104, the transmission element 104 has a receiving groove 106 that is engaged by the coupling region 102 of the switch element 36**.

To guide and support the two spring legs 26, 28 on the switch element 36, the switch element 36 has a subregion 108 that extends essentially parallel to the assembly direction 30 and essentially parallel to the rotation axis 72. The two spring legs 26, 28 are guided between the subregion 108 and the guide rod 94. In the axial direction 34, the switch element 36 also has a lateral flank 110 on both a side oriented toward the stop element 100 and a side oriented away from the stop element 100; these flanks, together with the subregion 108 and the guide rod 94, hold the two spring legs 26, 28 in a desired position.

FIG. **5*a* shows a first switched position of the actuating unit 20 and the switch element 36 on the guide rod 94. In the first switched position, the transmitting element 22 of the actuating unit 20 rests against the third leg region 86 of the second spring leg 28. The switch element 36 here is situated in an end position resting against the stop element 100 on the guide rod 94. The transmission element 104 of the transmission unit 14 has one gear 112 for transmitting a drive moment to the hammer tube 66 and a second gear 114, which, in a second switched position of the switch element 36 and actuating unit 20, can be coupled to a second gear unit 116 of the transmission unit 14 that is rotatably supported on the intermediate shaft 62**.

With a rotation of the actuating unit 20 in the rotation direction 32 from a first switched position into a second switched position (FIGS. **5*a* and 5*b***), the transmitting element

22 of the actuating unit 20 moves along an arc toward the third leg region 90 of the first spring leg 26. As soon as the transmitting element 22 comes into contact with the switching bevel 42 of the third leg region 90, the transmitting element 22 exerts a pressure in the direction opposite from the direction 98 on the first spring leg 26, causing the switch spring 18 and the switch element 36 to move on the guide rod 94 in the axial direction 34 opposite from the direction 98. On a side oriented toward the transmitting element 22, the switching bevel 42 has a guide surface 44 that guides the transmitting element 22 into the second switched position while at the same time, the switch element 36 moves farther on the guide rod 94 in the direction opposite from the direction 98. If the actuating unit 20 and the transmitting element 22 are situated in the second switched position (FIG. 5*b*), then the fourth leg region 92 of the first spring leg 26 rests against the transmitting element 22, thus preventing the switch spring 18 and switch element 36 from moving back out of the second switched position in an undesirable fashion. In the second switched position, the second gear 114 of the transmission element 104 engages with an inner contour 118 of the second gear unit 116 that corresponds to the second gear 114. When switching from the first switched position into the second switched position, if a switching path of the switch element 36 is blocked—i.e. the second gear 114 of the transmission element 104 and the inner contour 118 are in a rotationally offset position in relation to each other that prevents the second gear 114 from engaging in the inner contour 118—then the switch spring 18 functions as an energy storage means 38 in which a switching force for moving the transmission element 104 into the second switched position can be stored. As soon as the switching path is free—i.e. the second gear 114 and the inner contour 118 of the second gear unit 116 are in a coinciding, synchronous position—the movement energy of the switch spring 18 is then transmitted to the switch element 36 so that the switch element 36, together with the transmission element 104, is moved farther in the direction opposite from the direction 98 and the second gear 114 engages with an inner contour 118 of the second gear unit 116.

If the actuating unit 20 is rotated from the second switched position into the first switched position in the rotation direction 32, then the transmitting element 22 presses against the third leg region 86 of the second spring leg 28, thus moving the switch spring 18—and together with it, the switch element 36 on the guide rod 94 and the transmission element 104 on the intermediate shaft 62—in the direction 98. During the switching procedure, the transmitting element 22 moves from an end region of the third leg region 86 remote from the second leg region 84 of the second spring leg 28 to an end region of the third leg region 86 close to the second leg region 84. If the actuating unit 20 and the transmitting element 22 are in the first switched position, then the switch element 36 on the guide rod 94 is in the end position oriented closer to the stop element 100.

The foregoing relates to the preferred exemplary embodiments of the invention, it being understood that other variants and embodiments thereof are possible within the spirit and scope of the invention, the latter being defined by the appended claims.

The invention claimed is:

1. A hand-held power tool, in particular a rotary hammer and/or a hammer chisel, comprising:

a transmission housing;

a transmission unit; and a switch device for the transmission unit mounted in the transmission housing, the switch device having a switch spring, and an actuating unit with a transmitting element, the switch spring having a receiving region that is provided to accommodate the transmitting element of the actuating unit upon assembly of the transmission housing and transmission unit, wherein the switch spring has a subregion composed of a helical spring portion of the switch spring which encloses a receiving region that accommodates an axially movable switch element embodied in the form of a switching plate belonging to the transmission unit.

2. The hand-held power tool as recited in claim 1, wherein the switch spring has at least two spring legs that define the receiving region to accommodate the transmitting element of the actuating unit.

3. The hand-held power tool as recited in claim 2, wherein the at least two spring legs are spaced apart from each other perpendicular to an assembly direction.

4. The hand-held power tool as recited in claim 2, wherein the at least two spring legs are provided to move in an axial direction of the switch element of the transmission unit when the actuating unit is moved in a rotation direction.

5. The hand-held power tool as recited in claim 3, wherein the at least two spring legs are provided to move in an axial direction of the switch element of the transmission unit when the actuating unit is moved in a rotation direction.

6. The hand-held power tool as recited in claim 1, wherein the switch spring constitutes at least one energy storage mechanism in which it is possible to store a switching force.

7. The hand-held power tool as recited in claim 2, wherein the switch spring constitutes at least one energy storage mechanism in which it is possible to store a switching force.

8. The hand-held power tool as recited in claim 3, wherein the switch spring constitutes at least one energy storage mechanism in which it is possible to store a switching force.

9. The hand-held power tool as recited in claim 2, wherein the switch spring constitutes at least one energy storage mechanism in which it is possible to store a switching force.

10. The hand-held power tool as recited in claim 2, wherein at least one spring leg of the switch spring has a switching bevel against which the transmitting element presses during at least one switching procedure.

11. The hand-held power tool as recited in claim 3, wherein at least one spring leg of the switch spring has a switching bevel against which the transmitting element presses during at least one switching procedure.

12. The hand-held power tool as recited in claim 4, wherein at least one spring leg of the switch spring has a switching bevel against which the transmitting element presses during at least one switching procedure.

13. The hand-held power tool as recited in claim 9, wherein at least one spring leg of the switch spring has a switching bevel against which the transmitting element presses during at least one switching procedure.

14. The hand-held power tool as recited in claim 10, wherein the switching bevel of the at least one spring leg has at least one guide surface for guiding the transmitting element.

15. The hand-held power tool as recited in claim 11, wherein the switching bevel of the at least one spring leg has at least one guide surface for guiding the transmitting element.

16. The hand-held power tool as recited in claim 12, wherein the switching bevel of the at least one spring leg has at least one guide surface for guiding the transmitting element.

17. The hand-held power tool as recited in claim 13, wherein the switching bevel of the at least one spring leg has at least one guide surface for guiding the transmitting element.

18. The hand-held power tool as recited in claim 3, wherein the at least two spring legs each have a respective leg region and the leg regions are situated in a region of the transmitting element, in a plane parallel to the assembly direction.

19. The hand-held power tool as recited in claim 1, wherein the transmitting element is embodied in the shape of a bar and is situated on the actuating unit, extending in a direction of a rotation axis of the actuating unit, eccentric to the rotation axis, on an inner side of the actuating unit oriented away from a selection knob.

20. The hand-held power tool as recited in claim 3, wherein the at least two spring legs are additionally spaced apart from each other in a direction that is oriented essentially perpendicular to a rotation axis of the actuating unit and are situated spaced apart from each other parallel to the rotation axis.

* * * * *